United States Patent [19]

Hayashi

[11] Patent Number: 5,581,392

[45] Date of Patent: Dec. 3, 1996

[54] OPTICAL SCANNER

[75] Inventor: Yoshinori Hayashi, Kawasaki, Japan

[73] Assignee: Ricoh Company, Ltd., Tokyo, Japan

[21] Appl. No.: 312,642

[22] Filed: Sep. 27, 1994

[30] Foreign Application Priority Data

Oct. 13, 1993 [JP] Japan .................................. 5-256119

[51] Int. Cl.⁶ .................................................. G02B 26/08
[52] U.S. Cl. .......................... 359/205; 359/197; 359/212; 359/217; 347/259
[58] Field of Search ...................................... 359/216, 217, 359/218, 196, 206, 232, 207; 250/234, 235, 236; 347/256, 259, 261; 235/470

[56] References Cited

U.S. PATENT DOCUMENTS

| | | | |
|---|---|---|---|
| 3,537,777 | 11/1970 | Flynn | 359/232 |
| 5,161,047 | 11/1992 | Tomita et al. | 359/206 |
| 5,208,694 | 5/1993 | Tomita | 359/207 |

FOREIGN PATENT DOCUMENTS

| | | |
|---|---|---|
| 60-642 | 1/1985 | Japan . |
| 1302217 | 12/1989 | Japan . |
| 4229819 | 8/1992 | Japan . |

Primary Examiner—Paul M. Dzierzynski
Assistant Examiner—Darren E. Schuberg
Attorney, Agent, or Firm—Oblon, Spivak, McClelland, Maier & Neustadt, P.C.

[57] ABSTRACT

A scanning image forming optical system has a conjugate lateral magnification smaller than one with respect to a cross scan-corresponding direction. The optical scanner has an opening member arranged between a light source device and a deflecting-reflecting face of an optical deflector. The opening member interrupts a peripheral portion of a laser beam while the laser beam passes through an opening portion. A position of the opening member is determined such that $\Delta/L \geq 0.32$. Where L is a distance between a deflected light beam deflected by the optical deflector and an image formed, and $\Delta$ is a distance between the image forming point and a conjugate image of the opening member. With this arrangement, it is possible to effectively reduce an influence of diffraction caused by the opening member, such as an aperture, and reduce a change in diameter of a light spot with respect to a defocusing amount.

9 Claims, 5 Drawing Sheets

OPTICAL SCANNER

BACKGROUND OF THE INVENTION

1. Field of the Invention

The present invention relates to an optical scanner using a laser beam.

2. Description of the Related Art

For example, an optical scanning system is shown in Japanese Patent Publication (KOKOKU) No. 60-642, Japanese Patent Application Laying Open (KOKAI) No. 1-302217, etc. In this optical scanning system, a laser beam is emitted from a light source device having a laser diode (LD) light source and is reflected on a deflecting-reflecting face as a deflected light beam. The deflected light beam is then converged by a scanning image forming optical system as a light spot onto a scanned face so as to perform an optical scanning operation. This optical scanning system is widely known in association with an optical printer, etc.

A diameter of the light spot must be stabilized to perform the optical scanning operation with high accuracy in a high density record, etc. For example, the diameter of the light spot becomes unstable by an aperture arranged between the light source device and an optical deflector.

The aperture is originally arranged to adjust a shape of the light spot and the light spot diameter and remove stray light, etc. The aperture interrupts a peripheral portion of the laser beam from the light source device. A light intensity distribution of the laser beam transmitted through the aperture is formed by this interruption of the peripheral portion of the laser beam in a shape in which a base portion of an original Gaussian type light intensity distribution of the laser beam is cut. Accordingly, an influence of diffraction is caused by the aperture in the intensity distribution of the light spot converted onto the scanned face.

In particular, in the optical scanner shown in each of the above Japanese publications, a real image of the aperture can be formed in the vicinity of the scanned face in a certain aperture position by an optical system including the scanning image forming optical system and arranged after the aperture when an image forming magnification of the scanning image forming optical system is smaller than one in a cross scan-corresponding direction. In this case, the cross scan-corresponding direction is set to a direction corresponding and parallel to a cross scanning direction on a virtual optical path provided by linearly developing an optical path from the light source to the scanned face along an optical axis of the scanning image forming optical system. In the following description, a main scan-corresponding direction is set to a direction corresponding and parallel to a main scanning direction on this virtual optical path. The diameter of the light spot is greatly changed by the diffractive influence in accordance with a shift between an image forming position of the deflected light beam and the scanned face. Namely, the diameter of the light spot is greatly changed by the diffractlye influence in accordance with a defocusing amount. Therefore, no stable diameter of the light spot can be obtained.

Japanese Patent Application Laying Open (KOKAI) No. 4-229819 shows an optical scanner for forming the real image of an aperture on this side with respect to the scanned face. However, there is a problem that the diameter of a light spot is greatly changed by an influence of Fresnel diffraction in accordance with the above defocusing amount.

SUMMARY OF THE INVENTION

It is therefore an object of the present invention to provide an optical scanner for effectively reducing an influence of diffraction caused by an opening means such as an aperture, etc., and reducing a change in diameter of a light spot with respect to a defocusing amount.

Another object of the present invention is to provide an optical scanner for effectively reducing an influence of diffraction caused by an opening means and making an optical arrangement compact.

Another object of the present invention is to provide an optical scanner for effectively reducing an influence of diffraction caused by an opening means and making an optical arrangement compact and providing a suitable light interrupting amount by the opening means.

In accordance with a first construction of the present invention, the above objects can be achieved by an optical scanner in which a laser beam emitted from a light source device having a laser diode light source and a coupling lens system is converged by a cylindrical optical system in a cross scan-corresponding direction and is formed as a linear image extending in a main scan-corresponding direction;

the laser beam is then deflected by an optical deflector having a deflecting-reflecting face in the vicinity of a forming position of the linear image; and an optical scanning operation is performed by converging the deflected light beam as a light spot onto a scanned face by a scanning image forming optical system;

the scanning image forming optical system having a conjugate lateral magnification smaller than one with respect to the cross scan-corresponding direction;

the optical scanner comprising opening means arranged between the light source device and the deflecting-reflecting face of the optical deflector;

the opening means interrupting a peripheral portion of the laser beam while the laser beam passes through an opening portion; and a position of the opening means being determined such that the following condition $$\Delta/L \geq 0.32 \tag{1}$$

is satisfied when L is set to a distance between a starting point of deflection of the light beam deflected by the optical deflector and an image forming point of a reference deflected light beam; and $\Delta$ is set to a distance between the image forming point and a conjugate image of the opening means formed by an optical system arranged after the opening means.

In accordance with a second construction of the present invention, the above objects can be also achieved by an optical scanner in which a laser beam emitted from a light source device having a laser diode light source and a coupling lens system is converged by a cylindrical optical system in a cross scan-corresponding direction and is formed as a linear image extending in a main scan-corresponding direction;

the laser beam is then deflected by an optical deflector having a deflecting-reflecting face in the vicinity of a forming position of the linear image; and an optical scanning operation is performed by converging the deflected light beam as a light spot onto a scanned face by a scanning image forming optical system;

the scanning image forming optical system having a conjugate lateral magnification smaller than one with respect to the cross scan-corresponding direction;

the optical scanner comprising opening means arranged between the light source device and the deflecting-reflecting face of the optical deflector;

the opening means interrupting a peripheral portion of the laser beam while the laser beam passes through an opening portion; and the opening means having a first opening member for interrupting the peripheral portion of the light beam in the main scan-corresponding direction and a second opening member for interrupting the peripheral portion of the light beam in the cross scan-corresponding direction; and a position of the second opening member being determined such that the following condition $$\delta/L \geq 0.32 \qquad (2)$$

is satisfied when L is set to a distance between a starting point of deflection of the light beam deflected by the optical deflector and an image forming point of a reference deflected light beam; and δ is set to a distance between the image forming point and a conjugate image of the second opening member formed by an optical system arranged after the second opening member.

In the optical scanner having each of the first and second constructions, it is possible to effectively reduce an influence of diffraction caused by the opening means such as an aperture, etc., and reduce a change in diameter of the light spot with respect to a defocusing amount.

Further, an optical arrangement of the optical scanner can be made compact and a suitable light interrupting amount can be provided by the opening means.

Further objects and advantages of the present invention will be apparent from the following description of the preferred embodiments of the present invention as illustrated in the accompanying drawings.

BRIEF DESCRIPTION OF THE DRAWINGS

each of FIGS. 5a to 5c is a view for explaining an optical scanner having a sixth construction of the present invention in accordance with one embodiment of the present invention; and FIG. 8 is a view showing only a characterizing portion of an optical scanner having a fifth construction of the present invention in accordance with one embodiment of the present invention in which a cylindrical mirror is used as a cylindrical optical system.

DESCRIPTION OF THE PREFERRED EMBODIMENTS

The preferred embodiments of an optical scanner in the present invention will next be described in detail with reference to the accompanying drawings.

In an optical scanner of the present invention, a laser beam emitted from a light source device having a laser diode light source and a coupling lens system is converged by a cylindrical optical system in a cross scan-corresponding direction and is formed as a linear image extending in a main scan-corresponding direction. The laser beam is then deflected by an optical deflector having a deflecting-reflecting face in the vicinity of a forming position of the linear image. An optical scanning operation is performed by converging the deflected light beam as a light spot onto a scanned face by a scanning image forming optical system. The scanning image forming optical system has a conjugate lateral magnification smaller than one with respect to the cross scan-corresponding direction. The optical scanner has an opening means arranged between the light source device and the deflecting-reflecting face of the optical deflector. The opening means interrupts a peripheral portion of the laser beam while the laser beam passes through an opening portion.

In the optical scanner having a first construction of the present invention, a position of the opening means is determined such that the following condition $$\Delta/L \geq 0.32 \qquad (1)$$

is satisfied. In this condition, L is set to a distance between a starting point of deflection of the light beam deflected by the optical deflector and an image forming point of a reference deflected light beam. The reference deflected light beam is set to a deflected light beam provided such that a principal ray is parallel to an optical axis of the scanning image forming optical system. Namely, the reference deflected light beam is a deflected light beam provided when an angle of deflection is equal to zero. Δ is set to a distance between the image forming point and a conjugate image of the opening means formed by an optical system arranged after the opening means. This optical system is located between the opening means and a scanned face on a virtual optical path provided by linearly developing an optical path from the light source to the scanned face along the optical axis.

The starting point of deflection of the above optical deflector is set to a position in which the above reference deflected light beam is reflected.

In the optical scanner having a second construction of the present invention, the opening means has a first opening member for interrupting the peripheral portion of the light beam in the main scan-corresponding direction and has a second opening member for interrupting the peripheral portion of the light beam in the cross scan-corresponding direction.

A position of the second opening member is determined such that the following condition $$\delta/L \geq 0.32 \qquad (2)$$

is satisfied. In this condition, L is set to a distance between a starting point of deflection of the light beam deflected by the optical deflector and an image forming point of a reference deflected light beam. δ is set to a distance between the image forming point and a conjugate image of the second opening member formed by an optical system arranged after the second opening member.

In accordance with a third construction of the present invention, the optical scanner having the second construction further has a light interrupting amount adjusting means for adjusting a light interrupting amount of the peripheral portion of the light beam in at least the second opening member. In accordance with a fourth construction of the present invention, at least the second opening member is arranged between the laser diode light source and the coupling lens system in the optical scanner having the second or third construction.

In accordance with a fifth construction of the present invention, the cylindrical optical system is constructed by a cylindrical lens system or a cylindrical mirror in the optical scanner having each of the first to fourth constructions. The cylindrical lens system is constructed by one cylindrical lens or more.

The opening means in the first construction can be constructed by an aperture or a slit member with respect to the fifth construction. Each of the first and second opening members in the second construction can be also constructed by an aperture and/or a slit member with respect to the fifth construction.

In accordance with a sixth construction of the present invention, the second opening member in the second construction is constructed by an aperture having a fixed opening width in the cross scan-corresponding direction and arranged between the laser diode light source and the coupling lens system. The light interrupting amount adjusting means is constructed by a displacing mechanism for displacing the aperture in an optical axis direction of the coupling lens system.

Figure 1:
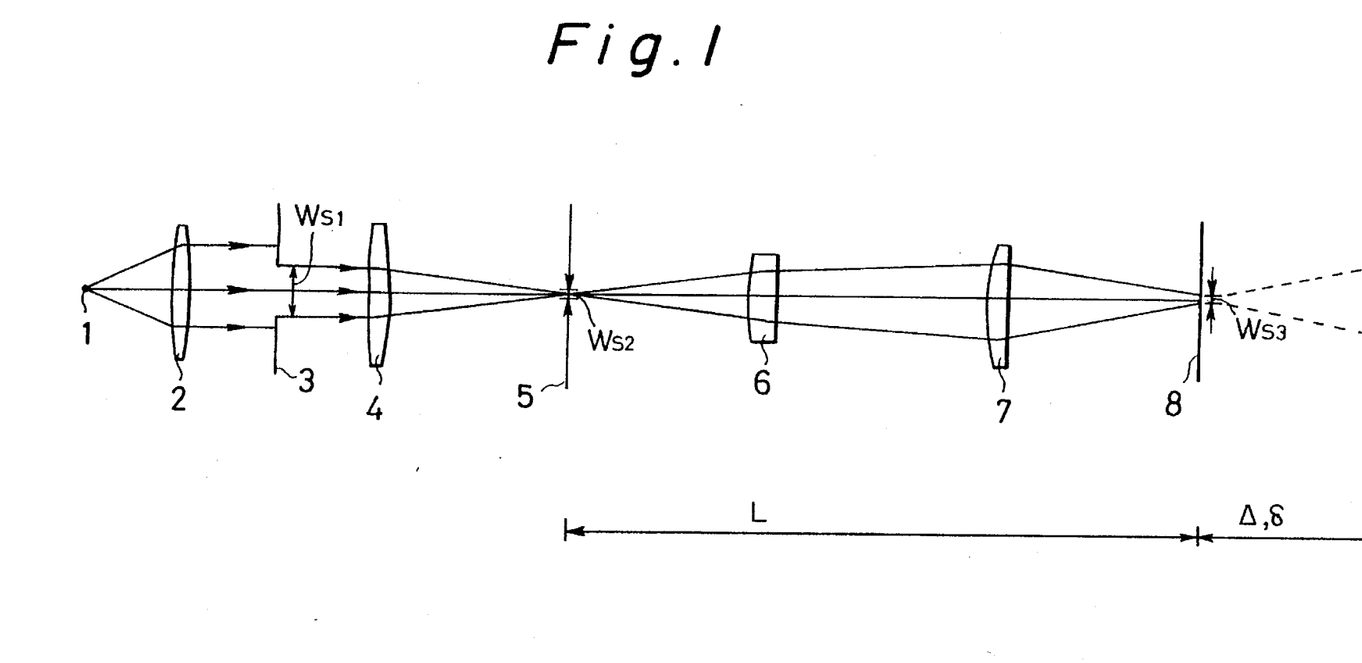
FIG. 1 is a view for explaining an optical arrangement of an optical scanner having a first construction of the present invention in accordance with one embodiment of the present invention.
Figure 2A:
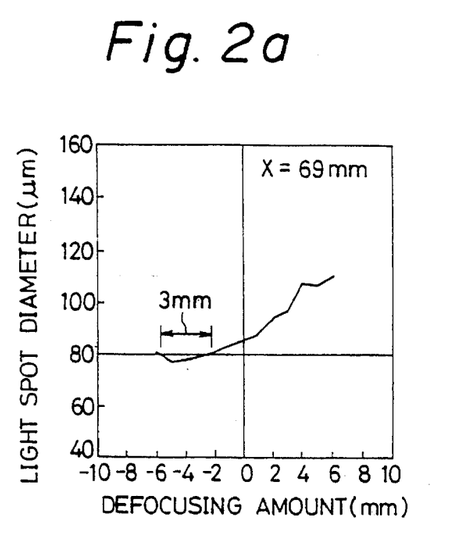
FIGS. 2a to 2d are graphs for explaining the relation between a distance from an opening means to a cylindrical lens system and depth characteristics in the optical arrangement shown in FIG. 1.
Figure 2B:
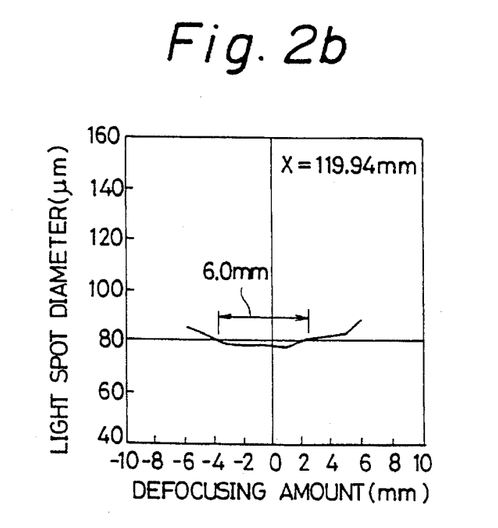
Figure 2C:
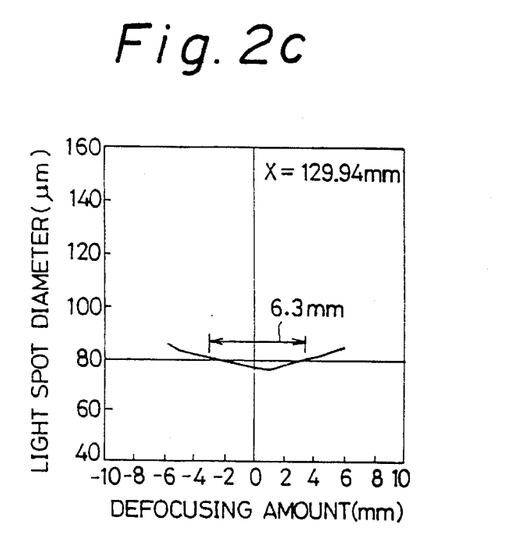
Figure 2D:
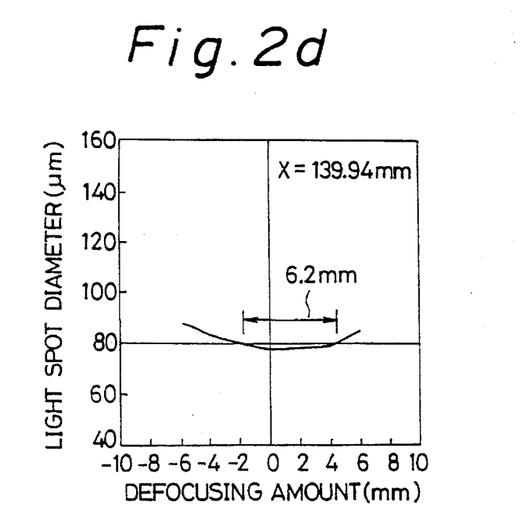

FIG. 1 shows an optical arrangement of an optical scanner to which the present invention can be applied. In this optical arrangement, an optical path from a laser diode (LD) light source 1 to a scanned face 8 is linearly developed along the optical axis of an optical system. A cross scan-corresponding direction is set to a vertical direction. A main scan-corresponding direction is set to a direction perpendicular to a paper face.

A divergent light beam is emitted from the laser diode (LD) light source i and is changed to a parallel light beam by a coupling lens system 2. The LD light source 1 and the coupling lens system 2 constitute a light source device. A peripheral portion of the light beam is interrupted by an aperture 3 as an opening means. The light beam is converged by a cylindrical lens system 4 in the cross scan-corresponding direction. The light beam is then formed as a linear image extending in the main scan-corresponding direction in the position of a deflecting-reflecting face 5 of an optical deflector.

The deflected light beam reflected on the deflecting-reflecting face 5 is converged as a light spot onto the scanned face 8 by an anamorphic scanning image forming optical system constructed by lenses 6 and 7.

As shown in FIG. 1, $W_{S1}$ is set to an opening width of the aperture 3 in the cross scan-corresponding direction. $W_{S2}$ is set to a width of the linear image formed on the deflecting-reflecting face 5. Namely, $W_{S2}$ is set to a width of the laser beam in the cross scan-corresponding direction in a position of the linear image. This width of the laser beam is the width of a light beam portion having a light intensity equal to or greater than $1/e^2$ times a peak intensity value. $W_{S3}$ is set to a beam waist diameter of a light spot formed in the vicinity of the scanned face 8 in a cross scanning direction. The following relations (3) and (4) are approximately formed with respect to these values $W_{S1}$, $W_{S2}$ and $W_{S3}$ when an influence of diffraction is neglected.

$$W_{S2}=k\cdot(\lambda/\pi)\cdot(f_{cy}/W_{S1}) \quad (3)$$

$$W_{S3}=\beta\cdot W_{S2} \quad (4)$$

In these relations, $\lambda$ is set to a wavelength of the laser beam and k is set to a proportional coefficient. $f_{cy}$ is set to a focal length of the cylindrical lens system 4 in the cross scan-corresponding direction. $\beta$ is set to a conjugate lateral magnification of the scanning image forming optical system.

As can be seen from the above relations (3) and (4), when the desirable diameter $W_{S3}$ is obtained as a light spot diameter in the cross scanning direction, the opening-width $W_{S1}$ of the aperture 3 must be reduced as the conjugate lateral magnification $\beta$ of the scanning image forming optical system is reduced.

$\beta<1$ is formed in the optical scanner of the present invention. In this case, the opening width $W_{S1}$ of the aperture 3 tends to be reduced so as to obtain the desirable diameter $W_{S3}$ of the light spot. Accordingly, Fresnel diffraction tends to be caused by the aperture 3.

As a result, the diameter of the light spot in the cross scan-corresponding direction tends to be greatly changed with respect to a defocusing amount as a shifting amount between an image forming position of the deflected light beam and the scanned face. The scanning image forming optical system sets a starting point of deflection and a position of the scanned face in the cross scan-corresponding direction in a conjugate relation in geometrical optics. Accordingly, no influence of Fresnel diffraction is caused with respect to the main scan-corresponding direction.

When the aperture 3 as an opening means is arranged in a front focal position of the cylindrical lens system 4, the scanned face 8 is set to be optically infinite when the scanned face 8 is seen from the aperture 3. Therefore, an image formed by the deflected light beam is set to a Fraunhofer diffraction image of an opening portion of the aperture in a considerable region including the scanned face even when the above conjugate lateral magnification $\beta$ is smaller than one. Accordingly, the inclination of a change in diameter of the light spot in the cross scanning direction is small and gentle when the defocusing amount is set to a parameter. Therefore, the change in diameter of the light spot in the cross scan-corresponding direction is small even when there is some defocusing between the image forming position of the deflected light beam and the scanned face.

The above condition (1) is a condition for setting the inclination of the change in diameter of the light spot in the cross scanning direction to be small and gentle with the defocusing amount as a parameter in the first construction of the present invention.

As mentioned above, the influence of Fresnel diffraction is caused only in the cross scan-corresponding direction. When the opening means is constructed by first and second opening members as in the second construction of the present invention, there is a problem about a conjugate image of the second opening member for restricting the light beam in the cross scan-corresponding direction. The above condition (2) is set to a condition for setting the inclination of the change in diameter of the light spot in the cross scanning direction to be small and gentle with the defocusing amount as a parameter.

Concrete examples of the present invention will next be explained.

One concrete example of optical system data will first be described in an optical arrangement shown in FIG. 1 and arranged after the aperture 3.

In the following description, X is set to a distance on an optical path from the aperture 3 to a light source side lens face of the cylindrical lens 4 on a virtual optical path which is provided by linearly developing an optical path from the above light source to the scanned face along the optical axis. R is set to a radius of curvature of each of optical elements in the cross scan-corresponding direction. D is set to a distance between faces of the optical elements and N is set to a refractive index of each of the optical elements.

|  | R | D | N |
| --- | --- | --- | --- |
| aperture 3 | ∞ | X | 1.0 |
| cylindrical lens system 4 | 48 | 5 | 1.511 |
| cylindrical lens system 4 | ∞ | 325 | 1.0 |
| lens 6 | ∞ | 13 | 1.766 |
| lens 6 | −137.0 | 98 | 1.0 |
| lens 7 | 48 | 3 | 1.511 |
| lens 7 | ∞ | 79 | 1.0 |

D=79 with respect to a lens 7 shows a distance on the optical axis between a scanned face side lens face of this lens 7 and the scanned face. A conjugate lateral magnification β of the scanning image forming optical system constructed by lenses 6 and 7 in the cross scan-corresponding direction is equal to 0.39. The lens 7 is constructed by an elongated cylindrical lens.

When the value of X mentioned above is set to 69 mm, 119.94 mm, 129.94 mm and 139.94 mm, the values of L, Δ, Δ/L and depth mentioned above are provided as follows.

| X | Δ | L | Δ/L | depth (mm) |
| --- | --- | --- | --- | --- |
| 69 | 22 | 430 | 0.05 | 3.00 |
| 119.94 | 136 | 430 | 0.32 | 6.00 |
| 129.94 | ∞ | 430 | ∞ | 6.30 |
| 139.94 | 136 | 430 | 0.32 | 6.20 |

The diameter of the light spot formed on the scanned face in the cross scanning direction is changed by a shift as the defocusing amount between the scanned face and the image forming position of the deflected light beam in the cross scan-corresponding direction. The above depth is set in a range of the defocusing amount in which the diameter of the light spot in the cross scan-corresponding direction is equal to or smaller than a designing value of 80 μm. The diameter of the light spot in the cross scan-corresponding direction is stabilized in a wider range of the defocusing amount as the numeric value (mm) of depth is increased.

In the above example, when Δ/L is equal to or greater than 0.32, the depth is equal to a sufficiently large value such as 6 mm or more so that the diameter of the light spot is stabilized. In contrast to this, when Δ/L is smaller than 0.32 and is equal to 0.05 as in the above example, the depth is equal to a small value of 3 mm so that it is difficult to perform an optical scanning operation using the light spot having a stable diameter.

Each of FIGS. 2a to 2d shows the relation between the defocusing amount and the diameter of the light spot in the cross scan-corresponding direction when the value of X mentioned above is set to 69 mm, 119.94 mm, 129.94 mm and 139.94 mm. An axis of abscissa shows the defocusing amount and an axis of ordinate shows the diameter of the light spot in the cross scan-corresponding direction. In these figures, the depth is set in an abscissa axis region in which a relative curve shows a light spot diameter equal to or smaller than 80 μm. The depth is reduced to a small value of 3 mm in FIG. 2a corresponding to Δ/L=0.05 by an influence of Fresnel diffraction caused by the aperture 3 as an opening means.

Figure 3:
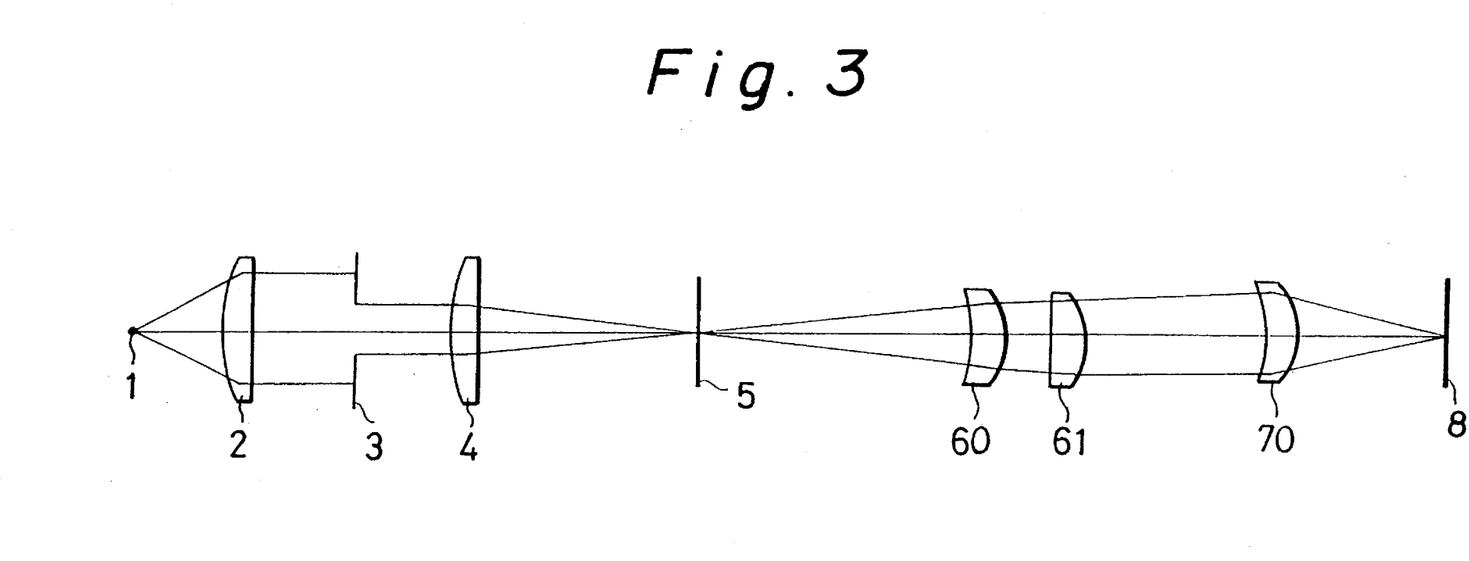
FIG. 3 is a view for explaining an optical arrangement of the optical scanner having the first construction in accordance with another embodiment of the present invention.
Figure 4A:
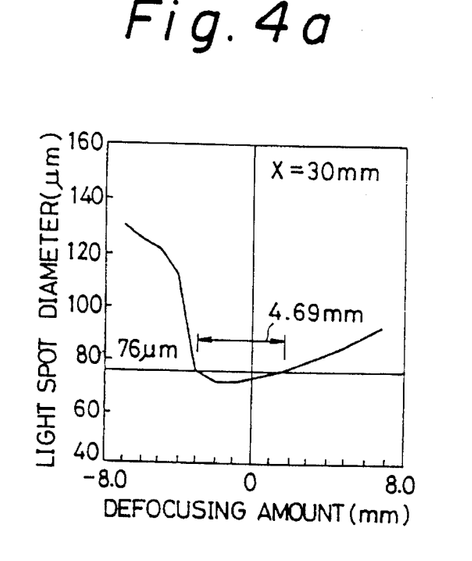
FIGS. 4a to 4d are graphs for explaining the relation between a distance from an opening means to a cylindrical lens system and depth characteristics in the optical arrangement shown in FIG. 3.
Figure 4B:
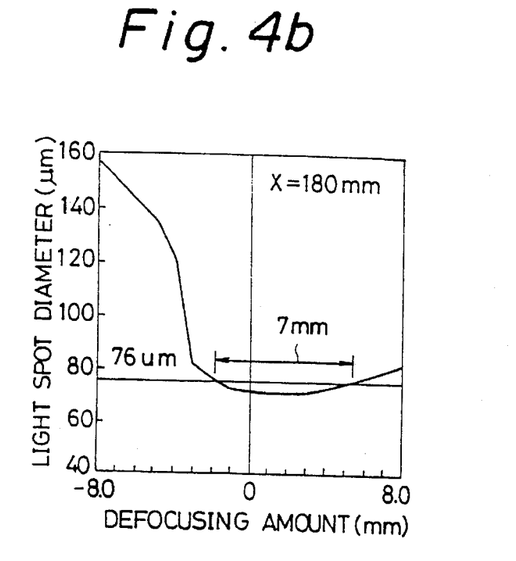
Figure 4C:
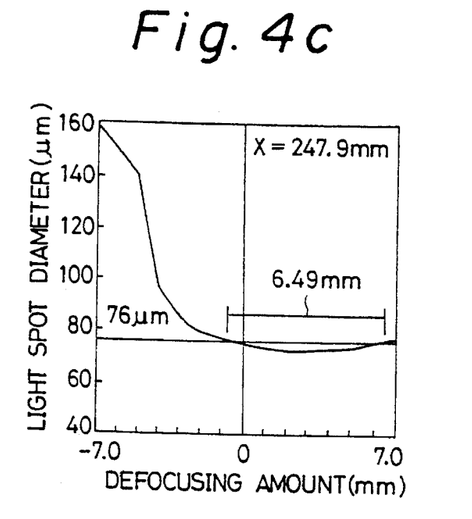
Figure 4D:
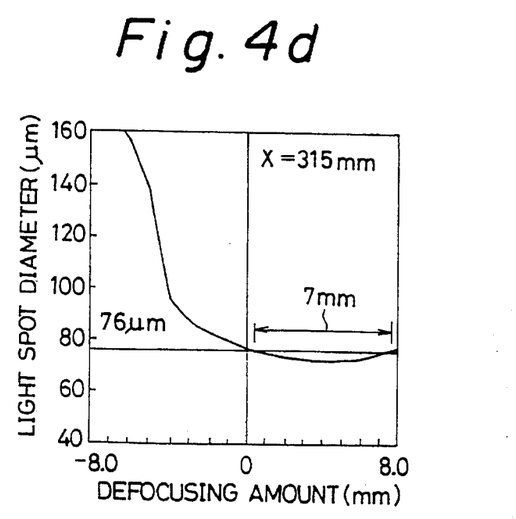

FIG. 3 similar to FIG. 1 shows an optical scanner in accordance with another embodiment of the present invention. The differences between FIGS. 1 and 3 are that a scanning image forming optical system is constructed by three lenses 60, 61 and 70. The lens 70 is constructed by an elongated toroidal lens.

One concrete example of optical system data will next be described in an optical arrangement shown in FIG. 3 and arranged after an aperture 3. A describing form is similar to that in the example of FIG. 1.

|  | R | D | N |
| --- | --- | --- | --- |
| aperture 3 | ∞ | X | 1.0 |
| cylindrical lens system 4 | 64.5 | 3 | 1.511 |
| cylindrical lens system 4 | ∞ | 162 | 1.0 |
| lens 60 | −140.1 | 18.8 | 1.572 |
| lens 60 | −113.9 | 2.7 | 1.0 |
| lens 61 | ∞ | 23.5 | 1.572 |
| lens 61 | −150.0 | 111.5 | 1.0 |
| lens 70 | −43.6 | 3 | 1.572 |
| lens 70 | −20.3 | 88 | 1.0 |

A conjugate lateral magnification β of the scanning image forming optical system constructed by the lenses 60, 61 and 70 in the cross scan-corresponding direction is set to 0.6.

The values of L, Δ, Δ/L and depth mentioned above are provided as follows when the value of X mentioned above is set to 30 mm, 180 mm, 247.9 mm and 315 mm.

| X | Δ | L | Δ/L | depth (mm) |
| --- | --- | --- | --- | --- |
| 30 | 26.5 | 293 | 0.09 | 4.69 |
| 180 | 93 | 293 | 0.32 | 7.00 |
| 247.9 | ∞ | 293 | ∞ | 6.49 |
| 315 | 93 | 293 | 0.32 | 7.00 |

In this example, the depth is set in the range of a defocusing amount in which the diameter of the light spot in the cross scan-corresponding direction is equal to or smaller than a designing value of 80 μm. When Δ/L is equal to or greater than 0.32 in this example, the depth is sufficiently large so that the diameter of the light spot is stabilized. In contrast to this, when Δ/L is reduced from 0.32 and is equal to 0.09 as in the above example, the depth is equal to a small value of 4.69 mm so that it is difficult to perform an optical scanning operation using the light spot having a stable diameter.

Each of FIGS. 4a to 4d shows the relation between the defocusing amount and the diameter of the light spot in the cross scan-corresponding direction when the value of X is set to 30 mm, 180 mm, 247.9 mm and 315 mm in the example of FIG. 3. An axis of abscissa shows the defocusing amount and an axis of ordinate shows the diameter of the light spot in the cross scan-corresponding direction. The depth is reduced to a small value of 4.69 mm in FIG. 4a corresponding to Δ/L=0.09 by an influence of Fresnel diffraction caused by the aperture 3 as an opening means.

From these examples, it should be understood that a preferable optical scanning operation can be generally performed by stabilizing the diameter of the light spot in the cross scanning direction when the condition (1) is satisfied with respect to an optical system arranged after the aperture. As mentioned above, no influence of Fresnel diffraction is caused by the opening means in the main scanning direction. Accordingly, the diameter of the light spot in the main scanning direction is stabilized.

In the above two examples, when Δ/L is set to be equal to or greater than 0.32 so as to stabilize the diameter of the light spot, the length of an optical path from the aperture 3 as the opening means to the cylindrical lens system 4 is considerably increased. This length of the optical path is equal to 119.94 mm in the example of FIG. 1 and is equal to 180 mm in the example of FIG. 3. For example, it is therefore necessary to bend the optical path through one plane mirror or more between the aperture 3 and the cylindrical lens system 4 so as to make the optical scanner compact.

An opening means is arranged between the laser diode (LD) light source and the coupling lens system as a method for effectively making the optical scanner compact. In such a method, a coupling lens having positive refracting power is included in an optical system arranged after the opening means. Accordingly, the position of a conjugate image of the opening means formed by the optical system arranged after the opening means is shifted from the scanned face onto a deflecting-reflecting face side. Therefore, Δ is increased so that the length of an optical path from the opening means to the cylindrical optical system can be reduced.

A divergent angle of the divergent laser beam emitted from the laser diode (LD) light source is slightly changed in accordance with the individual LD light source. When a uniformly designed aperture is arranged between the LD light source and the coupling lens system, there is a fear of a situation in which restricting amounts of the light beam with respect to apertures are different from each other every scanning operation.

To cope with such a situation, the opening means is constructed by first and second opening members when the opening means is arranged between the LD light source and the coupling lens system. The first opening member interrupts a peripheral portion of the light beam in the main scan-corresponding direction. The second opening member interrupts a peripheral portion of the light beam in the cross scan-corresponding direction. In accordance with a third construction of the present invention, it is preferable to arrange a light interrupting amount adjusting means for adjusting an interrupting amount of the peripheral portion of the light beam in at least the second opening member.

In such a case, only a second opening means is arranged between the LD light source and the coupling lens system in accordance with a fourth construction of the present invention. It is sufficient to arrange a first opening means in a suitable position between the coupling lens and the optical deflector and satisfy the condition (2) instead of the above condition with respect to the second opening means in accordance with a second construction of the present invention. This is because Fresnel diffraction giving an influence to a depth at a diameter of the light spot is caused only in the cross scan-corresponding direction as mentioned above.

Figure 5A:
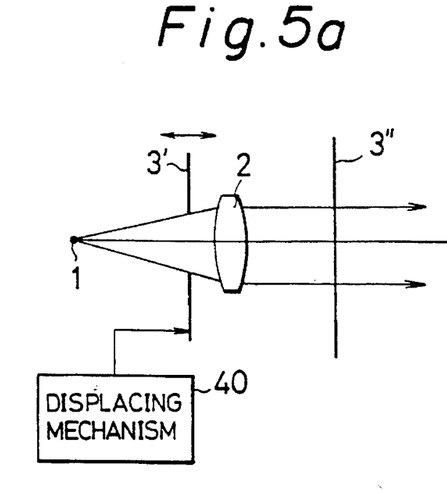
Figure 5B:
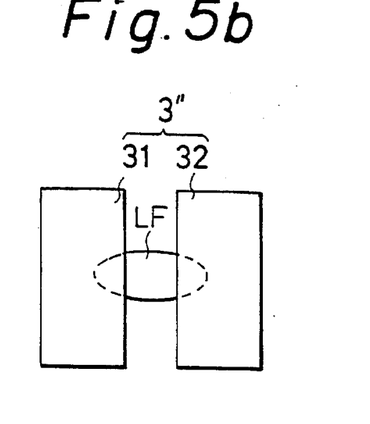

FIG. 5a schematically shows only a characterizing portion of an optical scanner having each of second and sixth constructions of the present invention in accordance with one embodiment of the present invention. Reference numerals 3' and 3" respectively designate a second opening means and a first opening means. The First opening means 3" is arranged behind a coupling lens system 2. As shown in FIG. 5b, the first opening means 3" is constructed by a slit member set such that two light-interrupting plates 31 and 32 are combined with each other to form a slit. The first opening means 3" restricts a peripheral portion of a parallel light beam LF formed by the coupling lens system 2 in a main scan-corresponding direction set to a horizontal direction in FIG. 5b. A slit width as an opening diameter formed by the light interrupting plates 31 and 32 may be adjusted by a well-known adjusting means in accordance with necessity.

The second opening means 3' is constructed by an aperture having a rectangular opening portion which has a sufficient width in a main scanning direction and has a predetermined width in a cross scanning direction. No second opening means 3' restricts the light beam in the main scanning direction. The second opening means 3' can be displaced by a displacing mechanism 40 in an optical axis direction of the coupling lens system 2.

Figure 5C:
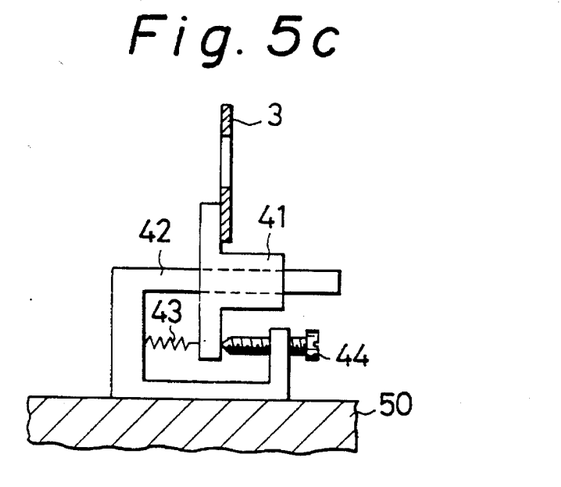

As shown in FIG. 5c, the displacing mechanism 40 is constructed by a holding body 41, a supporting body 42, a compressive spring 43 and an adjusting screw 44. The holding body 41 holds the second opening means 3'. The supporting body 42 is slidably fitted into this holding body 41 in the optical axis direction of the coupling lens system 2. This optical axis direction is set to a horizontal direction in FIG. 5c. The supporting body 42 is fixed to a fixed member 50 of the optical scanner. The compressive spring 43 is arranged between the holding body 41 and the supporting body 42 and applies resilient force toward a left-hand side in FIG. 5c to the holding body 41. The adjusting screw 44 applies force equal to the resilient force of this compressive spring 43 to the holding body 41. A position of the second opening means 3' can be displaced and adjusted by adjusting the adjusting screw 44 in the optical axis direction of the coupling lens system 2.

The laser beam emitted from the LD light source 1 is set to a divergent light beam between the light source and the coupling lens system 2. Accordingly, in accordance with a sixth construction of the present invention, a restricting amount of the laser beam can be adjusted and set to a desirable amount in the cross scan-corresponding direction by displacing and adjusting the second opening means 3' as mentioned above.

In the above embodiment, the cylindrical lens system is used as a cylindrical optical system in which the laser beam from the light source device is converged only in the cross scan-corresponding direction. However, in accordance with a fifth construction of the present invention, the cylindrical optical system can be also constructed by a cylindrical mirror instead of the cylindrical lens system.

Figure 6:
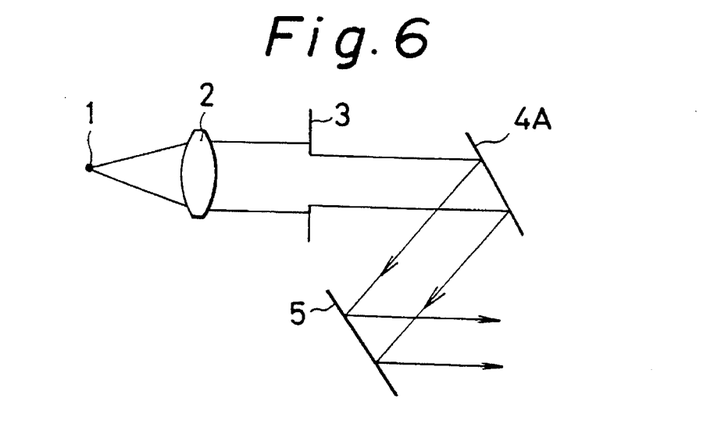

FIG. 6 schematically shows only a characterizing portion of a cylindrical mirror used as the cylindrical optical system in accordance with one embodiment of the present invention. In FIG. 6, a laser beam is emitted from a laser diode (LD) light source 1 and is changed to a parallel light beam by a coupling lens system 2. This laser beam is then converged by a cylindrical mirror 4A only in a cross scan-corresponding direction perpendicular to a paper face. The converged light beam is formed as a linear image extending in a main scan-corresponding direction in the vicinity of a deflecting-reflecting face 5. The light beam is then reflected on the deflecting-reflecting face 5 and is changed to a deflected light beam.

When the cylindrical mirror is used as the cylindrical optical system, the cylindrical mirror has a function for forming the linear image and a function for bending an optical path. Accordingly, an optical arrangement can be made compact by using such an optical path bending function.

As mentioned above, in the above-mentioned novel optical scanner of the present invention, it is possible to effectively prevent an influence of Fresnel diffraction caused by an opening means such as an aperture and perform a preferable optical scanning operation using a light spot having a stable diameter.

No arranging position of the opening means is limited to a position provided in the above embodiment. For example, the opening means may be arranged between the cylindrical optical system and the optical deflector. The scanning image forming optical system has a conjugate lateral magnification smaller than one with respect to the cross scan-corresponding direction so that tolerance is increased. Accordingly, a small diameter of the light spot can be realized without requiring high accuracy in a lens face.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner in which a laser beam emitted from a light source device having a laser diode light source and a coupling lens system is converged by a cylindrical optical system in a cross scan-corresponding direction and is formed as a linear image extending in a main scan-corresponding direction;

the laser beam is then deflected by an optical deflector having a deflecting-reflecting face in the vicinity of a forming position of said linear image; and an optical scanning operation is performed by converging the deflected light beam as a light spot onto a scanned face by a scanning image forming optical system;

said scanning image forming optical system having a conjugate lateral magnification smaller than one with respect to the cross scan-corresponding direction;

the optical scanner comprising opening means arranged between said light source device and the deflecting-reflecting face of the optical deflector;

the opening means interrupting a peripheral portion of the laser beam while the laser beam passes through an opening portion; and a position of said opening means being determined to satisfy the following condition $$\Delta/L \geqq 0.32 \qquad (1)$$

in order to reduce an influence of Fresnel diffraction caused by said opening means, where L is a distance between a starting point of deflection of the light beam deflected by said optical deflector and an image forming point of a reference deflected light beam and $\Delta$ is a distance between said image forming point and a conjugate image of the opening means formed by an optical system arranged after the opening means.

2. An optical scanner as claimed in claim 1, wherein the cylindrical optical system is constructed by a cylindrical lens system or a cylindrical mirror.

3. An optical scanner in which a laser beam emitted from a light source device having a laser diode light source and a coupling lens system is converged by a cylindrical optical system in a cross scan-corresponding direction and is formed as a linear image extending in a main scan-corresponding direction;

the laser beam is then deflected by an optical deflector having a deflecting-reflecting face in the vicinity of a forming position of said linear image; and an optical scanning operation is performed by converging the deflected light beam as a light spot onto a scanned face by a scanning image forming optical system;

said scanning image forming optical system having a conjugate lateral magnification smaller than one with respect to the cross scan-corresponding direction;

the optical scanner comprising opening means arranged between said light source device and the deflecting-reflecting face of the optical deflector;

the opening means interrupting a peripheral portion of the laser beam while the laser beam passes through an opening portion; and said opening means having a first opening member for interrupting the peripheral portion of the light beam in the main scan-corresponding direction and a second opening member for interrupting the peripheral portion of the light beam in the cross scan-corresponding direction; and a position of said second opening member being determined to satisfy the following condition $$\Delta/L \geqq 0.32 \qquad (2)$$

in order to reduce an influence of Fresnel diffraction caused by said opening means, where L is a distance between a starting point of deflection of the light beam deflected by said optical deflector and an image forming point of a reference deflected light beam and $\delta$ is a distance between said image forming point and a conjugate image of the second opening member formed by an optical system arranged after the second opening member.

4. An optical scanner as claimed in claim 3, wherein the optical scanner further comprises light interrupting amount adjusting means for adjusting a light interrupting amount of the peripheral portion of the light beam in at least the second opening member.

5. An optical scanner as claimed in claim 3, wherein at least the second opening member is arranged between the laser diode light source and the coupling lens system.

6. An optical scanner as claimed in any one of claims 3 to 5 wherein the cylindrical optical system is constructed by a cylindrical lens system or a cylindrical mirror.

7. An optical scanner as claimed in claim 4, wherein the second opening member is constructed by an aperture having a fixed opening width in the cross scan-corresponding direction and arranged between the laser diode light source and the coupling lens system; and the light interrupting amount adjusting means is constructed by a displacing mechanism for displacing said aperture in an optical axis direction of the coupling lens system.

8. An optical scanner as claimed in claim 4, wherein at least the second opening member is arranged between the laser diode light source and the coupling lens system.

9. An optical scanner as claimed in claim 8, wherein the cylindrical optical system is constructed by a cylindrical lens system or a cylindrical mirror.

* * * * *